Figure 1:
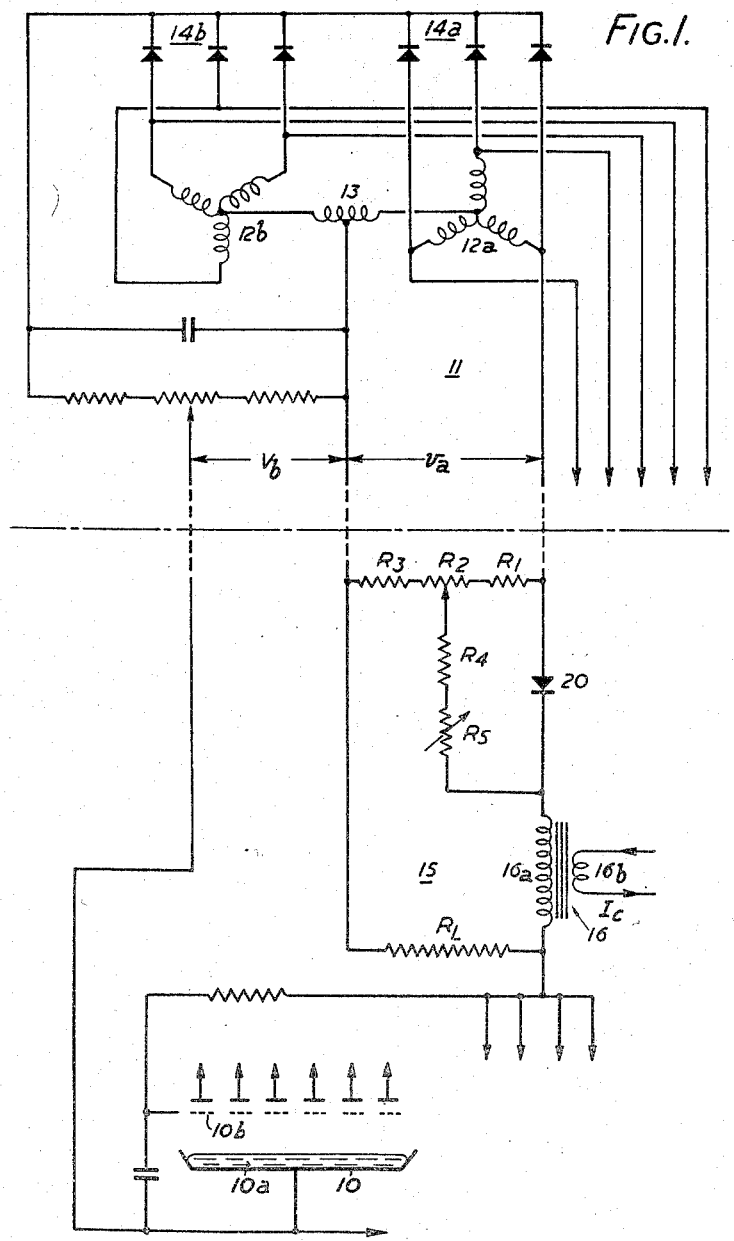

United States Patent Office 2,817,791
Patented Dec. 24, 1957

2,817,791

APPARATUS FOR THE CONTROL OF GRID-CONTROLLED ELECTRIC DISCHARGE DEVICES

David Lorimer Smart and Aleksa Gavrilovic, Stafford, England, assignors to The English Electric Company Limited, London, England, a British company Application May 4, 1955, Serial No. 505,986

Claims priority, application Great Britain May 7, 1954

14 Claims. (Cl. 315—147)

This invention relates to apparatus for the control of electric discharge devices of the grid-controlled type, such as mercury arc rectifiers.

A discharge device of this kind may be controlled by means of positive voltage impulses applied to the grid so that each impulse causes the device to conduct or "fire." It is often advantageous, especially in rectifier applications, to be able to vary the times at which such control impulses occur in relation to positive half-cycles of the applied anode voltage, so that the point in each half-cycle at which firing occurs can be controlled.

According to the present invention an apparatus for the control of a grid-controlled electric discharge device includes circuit elements comprising a saturable choke and a load impedance connected in series with a source of alternating voltage, and means for applying to the core of the said choke a magnetising field of variable strength, whereby when the said source is energised a series of steep-fronted voltage impulses appears across the said load impedance and is utilised to effect the control of the said discharge device, and whereby the phasing of the fronts of the said voltage impulses relative to the said alternating voltage can be varied by variation of the strength of the said field, the said apparatus including also an asymmetrically-conducting circuit element, arranged so that its presence tends to increase the effective impedance of the circuit including the said circuit elements to currents flowing at least through the said saturable choke in the opposite direction to currents giving rise to the said voltage impulses.

The said asymmetrically-conducting circuit element may be arranged in a number of ways, but according to a further feature of the invention, it is connected in series with the said source, the said choke and the said load impedance. The said asymmetrically-conducting circuit element preferably consists of a further impedance shunted by a uni-directionally conducting device such as a metal rectifier.

According to another feature of the invention, the said uni-directionally conducting device is connected between the said choke and the said source, the said impedance being connected at one end to the common connection of the said device and the said choke and at the other end to an intermediate point in a further impedance path across which the said alternating voltage is applied.

The various impedance elements of the circuit may be variable so as to provide a further means for varying the phasing of the pulses.

According to another feature of the invention, the said source is arranged to provide an alternating voltage having a waveform that is more nearly rectangular than is a sinusoidal waveform. Such a waveform may comprise at least a fundamental component and its third harmonic, and in a preferred form of the invention an alternating voltage having such a waveform is derived from a phase winding of a double-star six-phase transformer feeding a six-phase rectifier.

Figure 2:
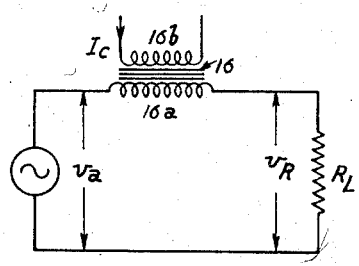

The foregoing and other features of the invention will be apparent in the typical control system for a bank of five mercury-arc rectifier tanks for six-phase operation which will now be described in detail. The description will refer to accompanying drawings, in which:

Fig. 1 shows, diagrammatically, the control system associated with one phase of the equipment (only one tank of which is shown), Fig. 2 shows, for purposes of explanation, a simplified form of the control circuit, and Figs. 3 to 7 show graphically the relationships between various quantities in the arrangements of Figs. 1 and 2.

The arrangement shown in Fig. 1 depicts the control circuits applicable to a six-phase, five-tank mercury arc rectifier bank, one tank of which is shown at 10. The supply unit 11 shown above the chain-dotted line is common to all phases of the bank, the circuits below the line being repeated for each phase.

The supply unit 11 comprises a double-star transformer-rectifier circuit including two star-connected three-phase windings 12a, 12b, connected together by an interphase reactor 13, and two three-phase metal rectifiers 14a, 14b. The unit provides a variable uni-directional bias voltage $V_b$, common to all the rectifiers, and also an alternating control voltage $v_a$ for each phase of the system; this control voltage is applied to the rectifier grids through individual control circuits 15. It will be seen that the instantaneous value of the bias voltage between the cathode 10a of the rectifier 10 and the control grid 10b associated with one phase of the system is the sum of the steady bias voltage $V_b$ and the voltage across the load resistor $R_L$ of the control circuit 15. The steady bias $V_b$ is sufficient to prevent the rectifier from firing; the control circuit 15 produces a series of voltage pulses across the load resistor $R_L$, the amplitude of these pulses being sufficient to cause the associated discharge paths to fire. By variation of the position of the control pulses in relation to the rectifier anode voltage the firing point of the rectifier, and hence its output, may be controlled.

The method of control employed may best be understood by first considering the simpler arrangement shown in Fig. 2. This figure shows a circuit comprising a saturable choke 16, having A. C. and control windings 16a and 16b respectively, the former being connected in series with a load $R_L$ and a source of alternating voltage $v_a$. The core of the choke 16 is assumed to have the B—H characteristic shown in Fig. 3, and the alternating voltage $v_a$ the waveform shown in Fig. 4.

Figure 3:
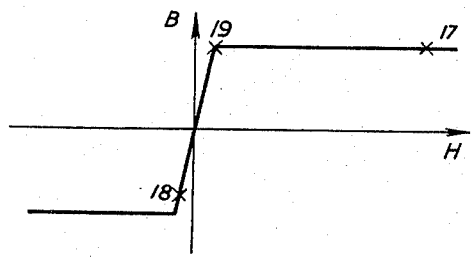
Figure 4:
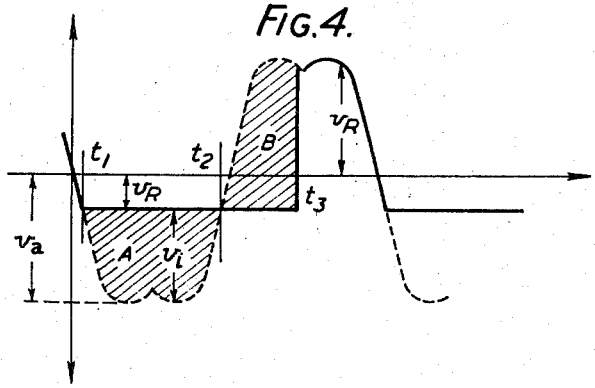

Suppose that the core is biased, by the passage of a direct current $I_c$ through the control winding 16b, to the point 17 on the B—H curve of Fig. 3; i. e. the core is saturated. The applied voltage $v_a$ is of such magnitude that one half-cycle of the resultant current, opposing the direct current ampere turns, brings the core out of saturation to the point 18 on the B—H curve, while the other half-cycles increase the saturation beyond the point 17. The voltage waveforms for this condition are shown in Fig. 4, the full line representing the voltage $v_R$ across the load $R_L$.

Assuming that negative half-cycles of $v_a$ bring the core out of saturation, at the beginning of a negative half-cycle the core is saturated and substantially all the applied voltage appears as the voltage $v_R$ across the load $R_L$. After the time $t_1$, however, the point 19 on the B—H curve is reached; the core becomes unsaturated and further change in the current in the circuit is opposed by the induced voltage in the winding 16a, so that the output voltage $v_R$ remains substantially constant. If the choke is of good design, small variations in $v_R$ due to the magnetising current in the unsaturated state can be ignored.

At a further time $t_2$ the point 18 on the B—H curve is reached, and the induced voltage across the choke changes sign. The core reaches its saturation state again at time $t_3$. The output voltage $v_R$ rises sharply until it substantially equals the applied voltage $v_a$, and remains equal to it for the remainder of the half-cycle. The waveform of the voltage $v_R$ thus consists of equally-spaced positive pulses corresponding to portions of positive half-cycles of the applied voltage $v_a$; in the intervals between pulses $v_R$ has a substantially constant negative value.

It can be shown that in the unsaturated condition the flux change in the core of the choke 16 is proportional to the time integral of the induced voltage $v_i$ across the winding 16a. Between the times $t_1$ and $t_3$, however, the point representing the state of the core on the B—H curve of Fig. 3 has moved from the point 19 to the point 18 and back to the point 19, i. e. the total flux change during this time is zero. Hence it follows that:

$$\int_{t_1}^{t_3} v_i \cdot dt = 0 \tag{1}$$

or $$\int_{t_1}^{t_2} v_i \cdot dt + \int_{t_2}^{t_3} v_i \cdot dt = 0 \tag{2}$$

This means that the shaded areas A and B in Fig. 4 must be equal; $v_i$ changes sign at $t_2$.

Between the times $t_1$ and $t_3$, i. e. when the core is unsaturated, the magnetising ampere-turns due to the control current $I_c$ in the winding 16b must, if the effect of the small magnetising current can be neglected, be equal to those due to the current in the winding 16a. Variation of the control current $I_c$ will thus result in variation of the current in the winding 16a and the load $R_L$ during this period; hence the value of $v_R$ between $t_1$ and $t_3$, and that of the area A, will also vary. In order to keep the areas A and B equal, the boundary of area B formed by the time ordinate $t_3$ must alter its position: the time at which the choke saturates in each positive half-cycle, and hence the phasing relative to the applied voltage $v_a$ of the leading edge of each positive voltage impulse across $R_L$, is thus determined by the value of the direct current $I_c$ in the control winding 16b. It will be seen that the phasing of the control pulses is advanced as the control current is increased.

The waveform of the voltage $v_a$ across any one phase winding of the transformers 12a and 12b comprises the fundamental supply frequency and its third harmonic, combined to produce the characteristic double-humped waveform shown in Fig. 4. Over a range of 120° in any half-cycle the amplitude of this voltage varies by only about 15% of its minimum value, so that the positive voltage pulses appearing across the load $R_L$ are held within corresponding limits.

It will be understood that it is possible for the voltage $v_a$ to have a sinusoidal waveform, but that in this case if the same range of 120° is utilised the pulse height when fully retarded will be only 50% of its maximum height, and in and near the fully-advanced state its rate of rise will be low. The most advantageous condition is that when the voltage $v_a$ has a square waveform, but any waveform which is more nearly rectangular than a sinusoidal waveform will effect some improvement in this respect.

Returning now to the circuit of Fig. 1, a metal rectifier 20 is connected in series with the choke winding 16a and is bypassed by a potentiometer network formed by the resistors $R_{1-5}$. The rectifier 20 is connected so as to oppose counter-clockwise currents flowing in the control circuit 15; during the interval between $t_1$ and $t_3$ (in Fig. 4), when such a counter-clockwise current is flowing, the resistive load in series with the choke comprises $R_L$ in series with the path $R_{1,2,4,5}$, the effect of the potentiometer $R_{1,2,3}$ being neglected at this stage. The resistance of the path $R_{1,2,4,5}$ may be about five times the resistance of $R_L$. Since the ampere turns due to the winding 16a and those due to the winding 16b must be equal, the voltage dropped across the resistive load in series with the choke when a counter-clockwise current is flowing is increased about six times for the same value of the control current, and the voltage across the choke itself ($v_i$ in Fig. 4) is correspondingly reduced. In order to maintain the necessary equality of the volt-time areas A and B, the choke must saturate at an earlier instant in the positive half-cycle, so that although the control current is unaltered the phasing of the control pulses is advanced. The circuit thus effects an economy in control power. On the other hand for clockwise currents the load in series with the choke consists of $R_L$ alone, so that the height of the positive control pulse is not affected. The value of $R_L$ is determined by the resistance required for the external grid-cathode path of the main rectifier, which is usually low compared with the value of resistive load required by the control circuit for economy in control power.

Figure 5:
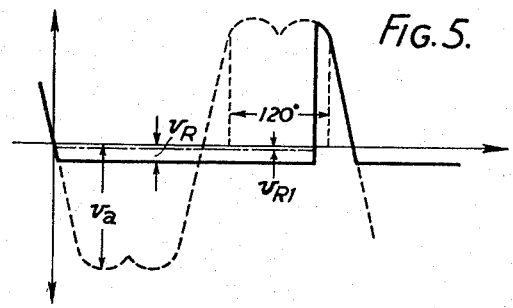
Figure 6:
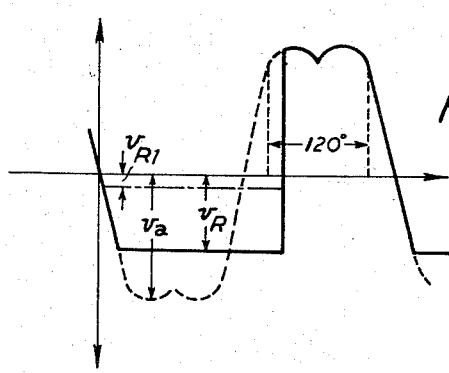

A further advantage of this circuit arrangement is that the negative output voltage shown as $v_R$ in Figs. 4, 5 and 6 is now shared between $R_L$ and the series path $R_{1,2,4,5}$, and the actual negative voltage across $R_L$ is reduced to one-sixth (with the same relative component values as above) of its formed value. This reduced voltage ($v_{R1}$) is indicated by the chain-dotted lines in Figs. 5 and 6. The cut-off bias applied to the rectifiers is determined by the D. C. output $V_b$ of the supply unit 11, and is relatively unaffected by the small negative voltages $v_R$, thus ensuring more constant working conditions for the rectifiers for all phasing conditions of the control pulses.

In the descriptions previously given of the mode of operation of the system, the control current $I_c$ has not necessarily borne a direct and simple relationship with the changes in phasing of the voltage pulses it produces. In particular the current $I_c$ is nowhere within the control range equal to zero. Control of the rectifiers may be simplified if zero control current corresponds to an extreme position, say the fully retarded position, of the pulses. This is achieved in the circuit of Fig. 1 by the potentiometer $R_{1,2,3}$. The variable potentiometer $R_2$ is provided for purposes of adjustment, and the explanation of the operation of this part of the circuit is simplified if its effect is ignored.

During positive half-cycles of the control voltage $v_a$ the whole voltage is applied across the choke winding 16a and the $R_L$ in series. During negative half-cycles, however, the voltage $v_{a1}$ across 16b, $R_L$, $R_4$ and $R_5$ in series is given by:

$$v_{a1} = \frac{R_3}{R_1 + R_3} \cdot v_a \tag{3}$$

Figure 7:
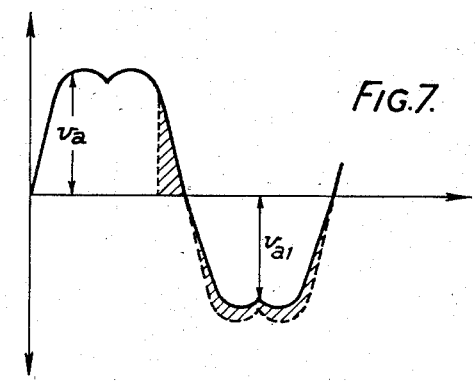

The point at which the choke saturates, with zero control current, is now determined by the equation:

$$\int_0^k v_a \cdot dt = \int_\pi^{2\pi} v_{a1} \cdot dt \tag{4}$$

where $k$ is the point in the positive half-cycle at which saturation occurs. This follows from the fact that over a complete cycle of $v_a$ the total flux change in the core of the choke 16 must be nil. The voltage waveforms for a case in which the choke saturates at about 150° in the positive half-cycle are shown in Fig. 7. The actual value of $k$ is of course determined by the values of $R_1$ and $R_3$.

In the control circuit 15 shown in Fig. 1, two variable elements are included, the potentiometer $R_2$ and the resistor $R_5$. The potentiometer $R_2$ provides a trimming control for the fully-retarded or zero control current state and the resistor $R_5$ for the fully-advanced state. It will be appreciated that variations between the B—H characteristics of the individual chokes of the equipment results in inaccurate phasing of the control impulses relative to each other. The variable controls $R_2$ and $R_5$ enable the phasings of the impulses to be correctly set without the need for a set of chokes matched to have closely similar characteristics, so as to ensure correct load balance between individual anodes.

What we claim as our invention, and desire to secure by Letters Patent, is:

1. Apparatus for the control of a grid-controlled electric discharge device, said apparatus including circuit elements comprising a saturable choke and a load impedance connected in series with a source of alternating voltage, and means for applying to the core of the said choke a magnetising field of variable strength whereby when the said source is energised the series of steep-fronted voltage impulses appears across the said load impedance and is utilised to effect the control of the said discharge device, and whereby the phasing of the fronts of the said voltage impulses relative to the said alternating voltage can be varied by variation of the strength of the said field, the said source of alternating voltage being arranged to provide an alternating voltage of a waveform that is more nearly a rectangular waveform than is a sinusoidal waveform.

2. Apparatus according to claim 1, wherein the said alternating voltage comprises at least a fundamental component and its third harmonic.

3. Apparatus according to claim 2, wherein the said alternating voltage is derived from a phase winding of a double-star six-phase transformer feeding a six-phase rectifier.

4. Apparatus for the control of a grid-controlled electric discharge device, the said apparatus including circuit elements comprising a saturable choke and a load impedance connected in series with a voltage source arranged to provide an alternating voltage having a waveform that is more nearly a rectangular waveform than is a sinusoidal waveform, and means for applying to the core of the said choke a magnetising field of variable strength, whereby when the said source is energized a series of steep-fronted voltage impulses appears across the said load impedance as the result of cyclical saturation and desaturation of the said core and is utilised to effect the control of the said discharge device, and whereby the phasing of the fronts of the said voltage impulses relative to the said alternating voltage can be varied by variation of the strength of the said field, the said apparatus including also an asymmetrically-conducting circuit element, arranged so that its presence tends to reduce the magnitude of currents flowing through at least one of the said circuit elements in such a direction that the potential produced thereby across the said load impedance is of opposite polarity to that of the said voltage impulses.

5. Apparatus for the control of a grid-controlled electric discharge device, said apparatus including circuit elements comprising a saturable choke and a load impedance connected in series with a source of alternating voltage, and means for applying to the core of the said choke a magnetising field of variable strength, whereby when the said source is energised a series of steep-fronted voltage impulses appears across the said load impedance as the result of cyclical saturation and desaturation of the said core and is utilised to effect the control of the said discharge device, and whereby the phasing of the fronts of the said voltage impulses relative to the said alternating voltage can be varied by variation of the strength of the said field, the said apparatus including also an asymmetrically-conducting circuit element, arranged so that its presence tends to increase the effective impedance of the circuit including the said circuit elements to currents flowing at least through the said saturable choke in the opposite direction to currents giving rise to the said voltage impulses.

6. Apparatus according to claim 5, wherein the said asymmetrically-conducting circuit element is connected in series with the said source, the said choke and the said load impedance.

7. Apparatus according to claim 6, wherein the said asymmetrically-conducting circuit element comprises an impedance and a uni-directionally conducting device connected in parallel therewith.

8. Apparatus according to claim 7, wherein the said impedance is connected at one end to a connection of the said uni-directionally conducting device and at the other end to an intermediate point in a further impedance path across which at least the greater part of the said alternating voltage is applied during at least those half cycles of the said alternating voltage which are of opposite polarity to the said voltage impulses.

9. Apparatus according to claim 8, wherein the said uni-directionally conducting device is connected between the said choke and the said source, the said impedance being connected at one end to the common connection of the said device and the said choke and at the other end to an intermediate point in a further impedance path across which the said alternating voltage is applied.

10. Apparatus according to claim 9, wherein the impedance value of the said impedance is controllably variable.

11. Apparatus according to claim 10, wherein the position of the said intermediate point in the said further impedance path is controllably variable.

12. Apparatus according to claim 5, wherein the said source is arranged to provide an alternating voltage having a waveform that is more nearly a rectangular waveform than is a sinusoidal waveform.

13. Apparatus according to claim 12, wherein the said alternating voltage comprises at least a fundamental component and its third harmonic.

14. Apparatus according to claim 13, wherein the said alternating voltage is derived from a phase winding of a double-star six-phase transformer feeding a six-phase rectifier.

References Cited in the file of this patent

UNITED STATES PATENTS

| | | |
|---|---|---|
| 2,081,844 | Winogard | May 25, 1937 |
| 2,190,353 | De Montrignier | Feb. 13, 1940 |
| 2,248,600 | Alexanderson et al. | July 8, 1941 |